United States Patent
Araki et al.

(10) Patent No.: US 7,136,782 B1
(45) Date of Patent: Nov. 14, 2006

(54) OPTICAL MEASUREMENTS IN FLUIDS USING DISTRIBUTED SENSOR NETWORKS

(75) Inventors: M. Sam Araki, Saratoga, CA (US); Peter Coe-Verbica, Santa Cruz, CA (US); Ashim Banerjee, Westminster, CO (US); Safwan Shah, San Jose, CA (US); Mobeen Bajwa, Fremont, CA (US)

(73) Assignee: ST-Infonox, Inc., Campbell, CA (US)

( * ) Notice: Subject to any disclaimer, the term of this patent is extended or adjusted under 35 U.S.C. 154(b) by 0 days.

(21) Appl. No.: 11/125,810

(22) Filed: May 9, 2005

(51) Int. Cl.
G06F 11/30 (2006.01)
G06F 15/00 (2006.01)

(52) U.S. Cl. ...................... 702/188; 702/185
(58) Field of Classification Search ................ 702/188, 702/182, 187, 189, 190, 44, 54, 186, 185, 702/50, 100; 340/514, 517, 540, 506; 250/261, 250/265
See application file for complete search history.

(56) References Cited

U.S. PATENT DOCUMENTS 6,303,916 B1 * 10/2001 Gladnick ................... 250/205

2002/0077711 A1 * 6/2002 Nixon et al. .................. 700/51
2003/0037602 A1 * 2/2003 Glasgow et al. ........... 73/61.41

OTHER PUBLICATIONS

E.S. Nahm et al ; Prediction of the amount of water supplied in wide-area waterworks; IEEE 1988, pp. 265-268.*

* cited by examiner

*Primary Examiner*—Bryan Bui
(74) *Attorney, Agent, or Firm*—Townsend and Townsend and Crew LLP (57) ABSTRACT

Methods and systems monitor a state of a fluid-distribution system. Sensors are distributed spatially within the fluid-distribution system. Each sensor is in peer-to-peer communication with another sensor to define a dynamically networked arrangement of sensors within the fluid-distribution system. The sensors have an illumination source, a light detector, and a controller to measure a photometric parameter. A base station is provided in communication with the sensors to access the networked arrangement of sensors. A central system is provided in communication with the base station and has programming instructions to identify an abnormality in the fluid-distribution system from data collected by the sensors.

31 Claims, 5 Drawing Sheets

OPTICAL MEASUREMENTS IN FLUIDS USING DISTRIBUTED SENSOR NETWORKS

BACKGROUND OF THE INVENTION

This application relates generally to fluid distribution systems. More specifically, this application relates to optical measurements in fluid distribution systems using distributed sensor networks.

Recent events worldwide have precipitated a generally heightened awareness of security issues in a diverse array of environments. Both citizens and governments have become more sensitive to ways in which systems may be vulnerable to attack, particularly systems that are used for distribution to large numbers of individuals. This includes, for example, fluid distribution systems like water-distribution systems that reach thousands or millions of people and air distribution systems in venues with large concentrations of people like sporting arenas and shopping centers. The ability for terrorists to introduce toxic agents into these systems provides an opportunity to cause widespread panic among a populace, even if the efforts do not result in widespread illness or death.

The problem of preventing the use of fluid and other distribution systems as a mechanism for terrorist activity is a challenging one. Currently, most efforts at addressing the issue center on control of centralized aspects of the distribution system. For example, efforts are being initiated to improve access control of water-treatment plants and the like by verifying the identity of those given access. These efforts are usually coupled with efforts to improve control over what materials are brought into such plants. These efforts are by no means being implemented uniformly and, even if they are successful will address only a part of the problem.

In particular, centralized parts of a distribution system do not represent the only mechanisms by which it may be accessed. For example, a water-distribution system could be accessed at any outlet of the system and toxic agents could be introduced into the system with a pump that provides sufficient back pressure. A terrorist could, for instance, introduce a toxic agent into a water-distribution system by renting an apartment in a metropolitan city and using a pump arrangement to force the toxic agent into the system for distribution to millions of others in the city. Even if security at the centralized water-treatment plant were perfect, it would still fail to prevent this type of activity.

There is accordingly a general need in the art for improved methods and systems for monitoring fluid distribution systems.

BRIEF SUMMARY OF THE INVENTION

Embodiments of the invention thus provide methods and systems for monitoring a state of a fluid-distribution system. A plurality of sensors are distributed spatially within the fluid-distribution system. Each of the sensors is in peer-to-peer communication with another of the sensors to define a dynamically networked arrangement of sensors within the fluid-distribution system. At least one of the sensors has an illumination source, a light detector, and a controller in communication with the illumination source and light detector to measure a photometric parameter of fluid in the fluid-distribution system local to the at least one of the sensors. A base station is provided in communication with at least one of the sensors to access the networked arrangement of sensors. A central system is provided in communication with the base station and has programming instructions to identify an abnormality in the fluid-distribution system from data collected by the plurality of sensors.

In some embodiments, the programming instructions include instructions to identify the occurrence of an event local to at least one of the sensors by identifying a change in an event-defining parameter. A plurality of derived parameters are extracted from the collected data. A cross-correlation of the extracted plurality of derived parameters is determined over the plurality of sensors. The abnormality is identified from the determined cross-correlation. The collected data may comprise a plurality of time-period correlatable parameters, in which case the plurality of derived parameters may be extracted by calculating an autocorrelation of each of the plurality of time-period correlatable parameters.

Embodiments of the invention may accommodate a number of different structures for the fluid-distribution system. In one embodiment, it comprises a hierarchical branching network with the plurality of sensors distributed throughout the hierarchical branching network. At least one sensor may be position between every pair of sequential nodes comprised by the hierarchical branching network.

A number of different types of photometric parameters may also be measure, including turbidity, light-scattering parameters, light-obfuscation parameters, colorimetric parameters, spectrophotometric parameters, and the light. Measurement of a calorimetric parameter may be performed when the illumination source comprises a multicolor illumination source. Measurement of a spectrophotometric parameter may be performed when the illumination source comprises a broadband source and the at least one of the sensors comprises an optically dispersive element disposed to separate spectral bands of light incident on the light detector. The illumination source and the light detector may have optical axes relatively orient at a nonzero angle in some instances, such as oriented at substantially 90° or oriented at substantially 180°. Furthermore, the sensors may sometimes include additional measurement capability, such as by including a chemical detector, a temperature detector, a pH detector, a conductivity detector, or the like. Conveniently, in one embodiment, the at least one of the sensors comprises a vibration power source to supply energy to the controller by extracting energy from motion of the fluid local to the at least one of the sensors.

The fluid-distribution system may be one of a plurality of environments, with each environment having a state monitored by the system. The central system may accordingly have programming instructions to correlate abnormalities identified in each of the environments to provide a collective characterization of the plurality of environments.

BRIEF DESCRIPTION OF THE DRAWINGS

A further understanding of the nature and advantages of the present invention may be realized by reference to the remaining portions of the specification and the drawings wherein like reference labels are used throughout the several drawings to refer to similar components. In some instances, reference labels include a numerical portion followed by a latin-letter suffix; reference to only the numerical portion of reference labels is intended to refer collectively to all reference labels that have that numerical portion but different latin-letter suffices.

DETAILED DESCRIPTION OF THE INVENTION

Embodiments of the invention provide methods and systems for monitoring fluid-distribution systems. The fluids may comprise liquids such as water or may comprise gases such as air. It is generally contemplated that the fluid-distribution system serves to provide the fluid to a multiplicity of people, sometimes geographically distributed people, although embodiments of the invention may generally be used with any type of fluid-distribution system. Examples of fluid distribution systems that may be monitored with embodiments of the invention include water-distribution systems at a variety of scales. For example, the water-distribution system may serve an area defined by a geographical or political boundary to provide treated water. At smaller scales, the water-distribution system may provide water to a single building, such as an office building or sports stadium. A sports stadium is one example of a facility that may use distribution systems for other liquids, such as by providing beer to a number of different outlets throughout the stadium from a central source. Other examples of systems used to distribute liquids will be known to those of skill in the art. Further examples of fluid distribution systems include air-distribution systems used in a variety of different types of buildings, such as sports stadiums, shopping malls, office buildings, and the like.

There are a number of different parameters that may be used in evaluating a state of a fluid, including turbidity, pH, conductivity, concentration of dissolved solids, and the like. Embodiments of the invention make use of optical measurements in fluids to provide such evaluations and sometimes couple the results with evaluations derived from other types of measurements, such as those indicated above. Optical measurements in fluids may include determinations of a variety of photometric parameters, such as light-scattering parameters, light-obfuscation parameters, calorimetric parameters, spectrophotometric parameters, and the like. Such measurements provide valuable information, either directly or by inference, that may be used to characterize a wide variety of physical and chemical parameters. Optical measurements of fluids have conventionally been made by sampling a small amount of the fluid and introducing it into a detection volume of an analytical instrument. The necessary constraints of sample size and sample points in a large fluid stream render this technique difficult for the kinds of applications described herein, particularly for fluid distribution systems that use large and distributed networks.

Embodiments of the invention instead make use of a distributed network of sensors that include optical-measurement components. The network is distributed throughout the fluid-distribution system so that optical parameters may be measured at a variety of different points within the system. The utility of the information collected by each sensor is significantly enhanced by including a capability for peer-to-peer communication among the sensors in forming the network. Information from each of the sensors is aggregated by an analysis module to identify whether there is sufficient evidence of an anomaly in the network. Such aggregation advantageously permits statistical effects to be reduced—highly localized fluctuations may be identified as likely to due an anomalous sensor reading, thereby reducing false-positive alarm generation; and slight but persistent fluctuations may be identified as an early indication of an actual anomaly, thereby reducing false-negative conditions. The sensors may be conveniently comprised by miniature sensor systems, which may be constructed at relatively low cost and deployed on numerous surfaces within the fluid-distribution system. Such miniature sensor systems are a variation of sensor systems sometimes described in the art as "motes."

Figure 1:
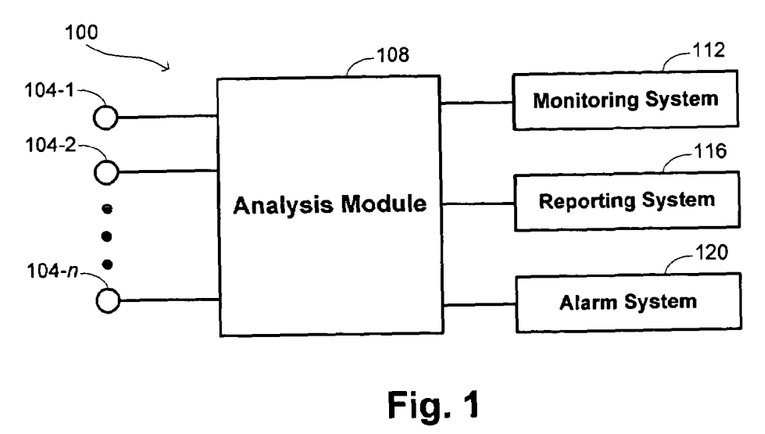
FIG. 1 provides a schematic diagram presenting an overview of a system in one embodiment of the invention.

A general overview of a system of the invention in one embodiment is provided in FIG. 1. An analysis module 108 is equipped to receive data from a plurality of sensors 104 distributed within the fluid-distribution system. The type of data collected by the sensors 104 and provided to the analysis module 108 may depend on specific aspects of the system, but generally include photometric parameters as described in greater detail below. Interfaced with the analysis module 108 may be monitoring systems 112, reporting systems 116, and/or alarm systems 120. The monitoring systems 112 allow real-time oversight of the state of the fluid-distribution system, with the reporting systems 112 permitting an account of a time evolution of the state to be provided and the alarm systems 120 permitting a notification to be issued upon determination that the fluid-distribution system is in an undesirable state.

The distribution of the sensors 104 may depend on specific characteristics of the states that are to be measured, but it is generally desirable that they be distributed throughout the fluid-distribution system so that the parameter values may be determined in a manner that allows characterization of the entire fluid-distribution system. Typically, distribution of the fluid through the system is achieved by flowing the fluid through a network of pipes, ducts, or other fluid-transmission components, with a source of pressure, such as a pump, fan, or other mechanism. It is common for the network of fluid-transmission components to be organized with a hierarchical arrangement, so that fluid is distributed by following a path defined according to selection of a number of branches in the arrangement. Such an arrangement is illustrated, for example, in FIG. 2, in which a distribution facility 200 is used to distribute fluid through a hierarchical network. The branching is achieved with a plurality of nodes 204, with fluid being directed to different branches according to relative sizes of the fluid-transmission components beyond each node.

The structure of distribution system may be conveniently be used in some embodiments for identifying positions of sensors 104. For example, with the hierarchical arrangement shown in FIG. 2, the location of a sensor 104 as within a particular stretch of fluid conduit may be specified in accordance with the hierarchical branching arrangement, with examples of identifications provided in the drawing. For instance, a sensor 104 located in the stretch of fluid conduit between node 204-2 and node 204-4 may have its location specified uniquely by specification of those two nodes, or may be specified as being located in conduit Aa3. Similarly, a sensor 104 located in the stretch of conduit between node 204-1 and node 204-3 may have its location specified uniquely in terms of those two nodes or by identifying it as being located in conduit Ad.

Figure 2:
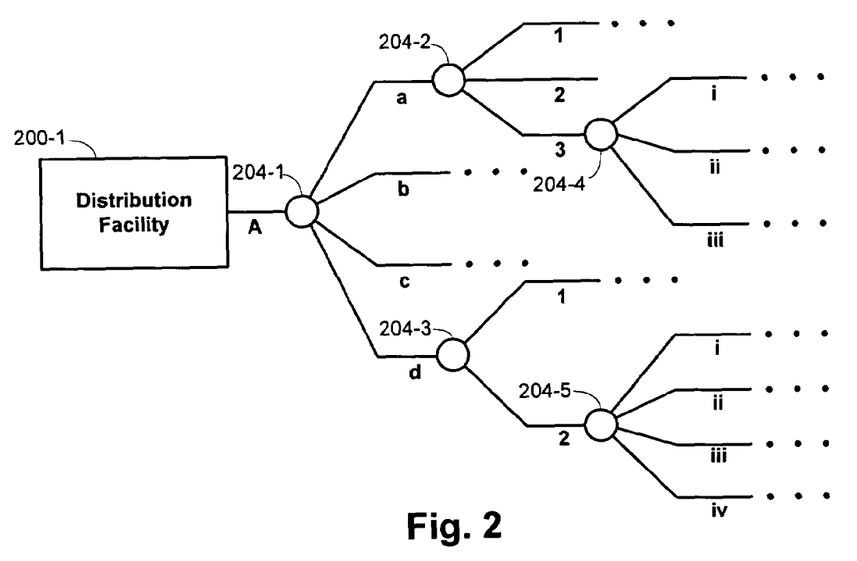
FIG. 2 provides a schematic diagram illustrating an arrangement of fluid distribution systems that may be monitored in embodiments of the invention.

Under normal circumstances, the sensors 104 will be fixed in positions on surfaces of the fluid-transmission components to permit the collection of data with known positions. Part of the analytical information used in evaluating the state of the fluid-distribution system thus includes a position for each of the sensors, thereby permitting potential anomalies to be localized. For instance, in a situation where a toxic substance is introduced into the system at an outlet with sufficient backpressure, localization of the anomaly may be useful identifying the source. Not only might this permit law-enforcement and emergency personnel to be notified of the potential source of a disruption, but could permit portions of the network to be isolated by closing valves and thereby preserve functioning of a portion of the system before full contamination.

Figure 3:
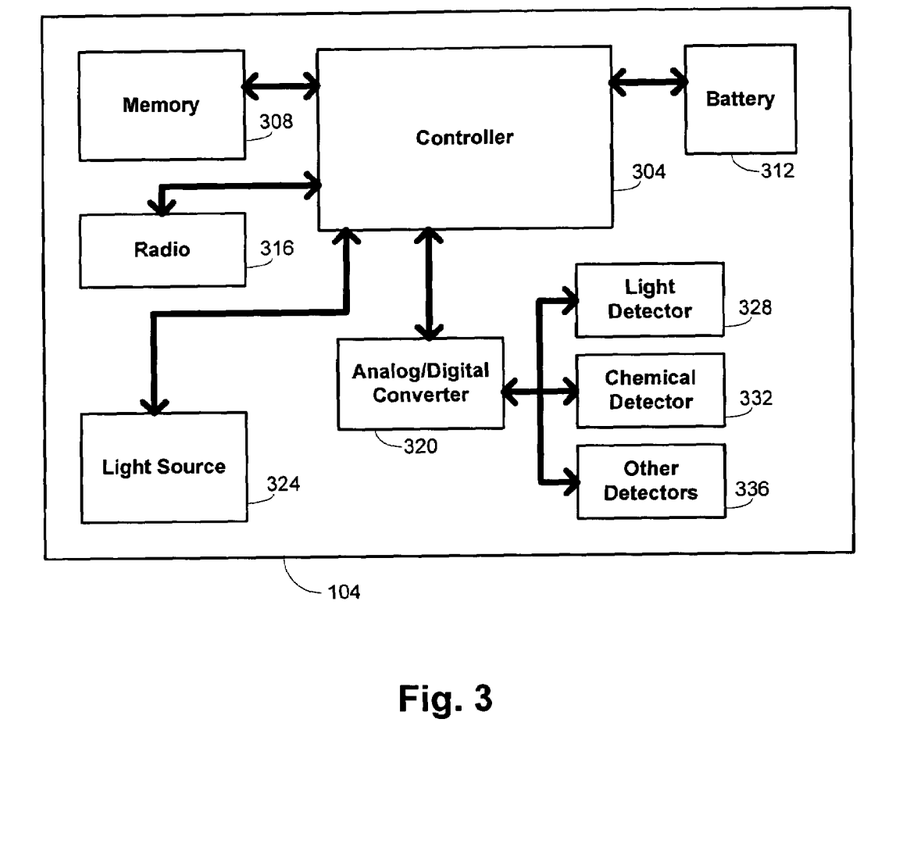
FIG. 3 provides an exemplary structure of a sensor that may be used in embodiments of the invention.

An example of a structure that may be used for the sensors is provided in FIG. 3. In a typical application, the size of the sensor 104 may be on the order of $cm^2$, although the invention is not restricted to a particular size for the sensor provided a plurality of sensors may be distributed throughout the fluid-distribution system with communications capabilities to establish a broadly distributed network. For instance, much smaller sensors may be used in other embodiments, having sizes on the order of $mm^2$. Each sensor 104 is generally self-contained, including a microcontroller 304 that coordinates functionality of the sensor 104 and a power source 312 that provides operational power. In some alternative embodiments, the sensor 104 may not include a separate power source but instead have a device for extraction of power from the external environment. For instances, vibration power might be used in some embodiments to power the sensor 104, with power being extracted from the flow energy of the fluid being distributed. A memory 308 may store information used by the controller, such as programming instructions used by the controller or such as data used by the controller in implementing embodiments of the invention.

The controller 304 is provided in communication with a radio 316, which permits electromagnetic signals to be transmitted and received by the sensor 104, thereby enabling communication with other sensors 104 and establishment of an ad hoc network. Typically, the range of the radio is about 10–400 feet, although embodiments of the invention are not restricted to any particular range, relying only on there being sufficient range that a network may be established. The combination of the radio 316 and controller 304 act as a transceiver that enables peer-to-peer communications to be effected among the sensors 104. This allows each sensor 104 to find other sensors 104 within radio range and create a dynamic network path to a base station. Data from each sensor 104 reaches the base station using this dynamic network path.

The controller 304 is also generally interfaced with a number of detectors, perhaps through an analog-digital converter 320 as appropriate. Embodiments of the invention generally include at least one light detector 328, which may be a photodiode, a phototransistor, or other light-sensitive electronic component. The light detector 328 is used in combination with a light source 324 whose operation is also provided under the control of the microcontroller 304. Examples of light sources 324 that may be used in different embodiments include light-emitting devices ("LEDs"), laser diodes, and the like. The type of photometric parameter that is measured may depend on specific characteristics of the light source 324 and/or light detector 328 and on relationships between the two, like their relative orientations. Thus, light-scattering properties of the fluid may be measured with different angles between the light source 324 and light detector 328—if oriented with a relative angle of 90°, the detector is sensitive to scattered light, if oriented with a relative angle of 180°, the opaqueness or turbidity of the fluid may be measured, and if oriented at other angles, the measurements may be more sensitive to different physical aspects of the fluid. In embodiments where the light source 324 comprise a plurality of wavelengths, such as may be provided by using multiple LEDs of different wavelengths, calorimetric parameters may be measured. Spectrophotometric parameters may be measured in embodiments where the light source 324 comprises a broadband source and a diffractive element is included, either as part of the light detector 328 or separately. For instance, the broadband source could be a white-light LED or other white-light source and the diffractive element could comprise a diffraction grating, a prism, or a grism.

In some embodiments, the sensor 104 may also include a chemical detector 332 adapted to identify the presence of certain substances in the fluid. For instance, such a chemical detector 332 might comprise a material having selective binding sites that will react in the presence of the substance. Furthermore, the sensor 104 may comprise other detectors 336 configured to detect temperature, pH levels, conductivity, or the like.

Figure 4:
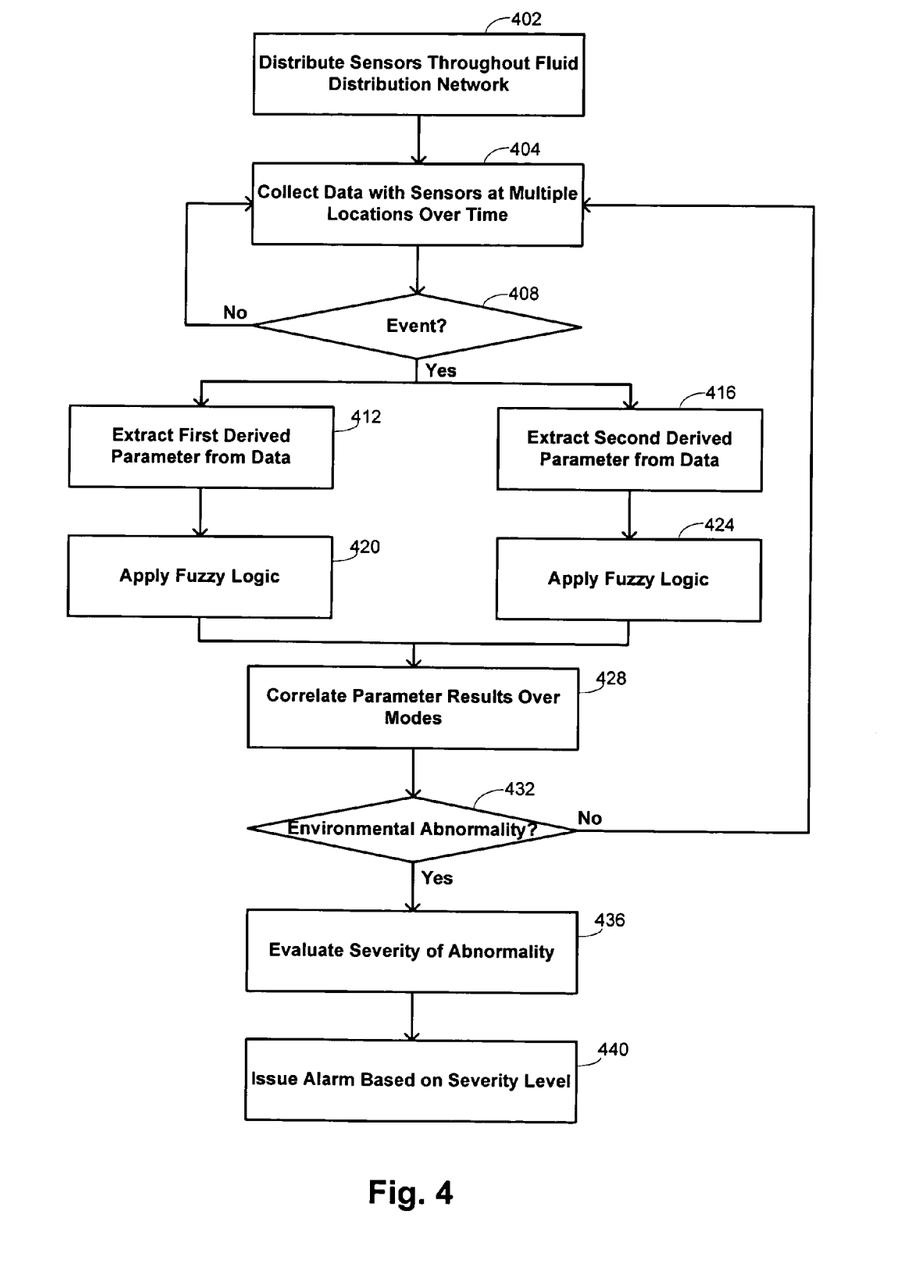
FIG. 4 is a flow diagram illustrating a method for monitoring a fluid-distribution system in an embodiment of the invention.

A plurality of the sensors 104 are distributed throughout the fluid-distribution system, as indicated at block 402 of the flow diagram of FIG. 4. This flow diagram illustrates generally a method by which information from the sensors 104 may be used diagnostically in evaluating a state of the fluid-distribution system. The use of multiple sensors 104 generally improves the reliability of identifying anomalous states. For instance, small changes in turbidity in one channel of the system may be lost as noise in normal statistical fluctuations, but the use of multiple sensors results in a signal that is smoothed out by an increase in signal-to-noise ratio. Generally, this signal-to-noise ratio improves as the square root of the number of points in the measurement so that a combination of 100 measurements would have a signal-to-noise ratio that is about ten times better than that observed at any individual measurement point.

In some embodiments, subsets of the sensors 104 are configured for collection of different types of optical data. For instance, some of the sensors 104 might be configured to make light-obfuscation measurements, while other sensors 104 make colorimetric measurements or spectrophotometric measurements. The availability of different types of measurements provides further information that may be used by combining the measurements to identify anomalies.

The communications abilities of the distributed sensors 104 provide a network in which data from all the sensors 104 are aggregated at a central information integration layer capable of offering a common operating picture of the behavior of the fluid-distribution system. This aggregated data offers the significant advantage of having sampled large spatial areas of the system and of having sampled much larger volumes of the fluid than would be possible using conventional instrumentation.

As the data are collected with the distributed sensors 104 at block 404, they are evaluated for the identification of an "event," which is defined by a predetermined rule and which is designated to occur at a time that conditions specified by the predetermined rule are satisfied. The predetermined rule may define an event in terms of a single sensor measurement, such as where an event occurs whenever the turbidity in a fluid stream exceeds 80 mNTU. Alternatively, the predetermined rule may define an event in terms of a combination of multiple sensor measurements, such as where an event occurs whenever the average turbidity of a fluid stream within a 50-m length exceeds 65 mNTU. In some instances, the event may be defined in terms of multiple parameters, such as where an event occurs when quantifications of light-obfuscation and colorimetric measurements are outside of defined ranges.

Upon identification that an event has occurred, multiple derived parameters may be extracted from the data. The specific parameters that are extracted may depend on the number and types of configurations of sensors 104 distributed within the fluid-distribution system. In some embodiments, the parameters may be derived as mean and/or standard deviation of the collected data for a particular measurement parameter over a small time interval, and may comprise other statistical measures in other embodiments. In instances where the data comprise time-period correlatable data, the derived parameters may comprise autocorrelation parameters. The results of an autocorrelation calculation may be fitted to a curve having a generic shape, with the fit coefficients acting as the derived parameters.

As indicated at block 412 and 416, such derived parameters may be determined in some embodiments for two different quantities $X_1$ and $X_2$. For instance, autocorrelation parameters may be derived from different types of data according to the specific configurations of the distributed sensors 104, say be determining autocorrelation functions for opaqueness data and for colorimetric data in one embodiment. In some embodiments, more than two derived parameters may be used, such as by additionally including an autocorrelation function for spectrophotometric data. In embodiments that use such multiple derived parameters, a cross-correlation of the derived parameters is calculated at block 428, and may be preceded by the application of fuzzy logic as part of the derived parameter extractions at blocks 320 and 324. The cross-correlation between derived parameters $X_1$ and $X_2$ may be calculated as $$R_{X_1 X_2} = \frac{\sum_i (X_1^{(i)} - \overline{X}_1) \sum_j (X_2^{(j)} - \overline{X}_2)}{\sigma_{X_1} \sigma_{X_2}},$$

where the mean of $X_k$ (k=1, 2) is given over the set of N sensors as $$\overline{X}_k = \frac{1}{N} \sum_i X_k^{(i)}$$

and the standard deviation of $X_k$ is given by $$\sigma_{X_k} = \sqrt{\frac{\sum_i (X_k^{(i)} - \overline{X}_k)^2}{N-1}}.$$

In these calculations, the correlations are calculated over multiple sensors identified by index i. The correlation determinations are generally performed over a greater number of sensors distributed within the fluid-distribution system than were used to identify the occurrence of the event. Usually, the number of sensors over which the correlations are determined is at least ten times the number of sensors used in identifying the event, but may be smaller than ten times in some instances. In some embodiments, the correlation determinations are made from data collected at all sensors provided within the fluid-distribution system. In embodiments that use more than two derived parameters, the correlation may be determined in a manner analogous to the two-parameter cross-correlation function described above as $$R_{X_1 X_2 \ldots X_M} = \frac{\prod_{m=1}^{M} \sum_i (X_m^{(i)} - \overline{X}_m)}{\prod_{m=1}^{M} \sigma_{X_m}}.$$

The results of the correlation determination are used at block 432 to evaluate whether the state of the fluid-distribution system has an abnormality. Such a determination may rely on whether the calculated correlation value is within a predefined range that specifies whether that the state of the fluid-distribution system is considered to be normal. If an abnormality is detected, the severity of the abnormality may be evaluated at block 436, such as by determining the degree to which the calculated correlation value is outside the predefined normal range. An alarm may be issued at block 440 based on the determined severity level. For example, a level of urgency associated with the alarm (e.g., yellow, orange, red, . . . ) may depend on how far outside the predefined normal range the calculated correlation value is.

In the above description, the calculations of correlation results have treated all sensors 104 equally. In other embodiments, different weighting factors $w_i$ may be applied to each of the sensors 1[4 so that in the above calculations $X_m^{(i)} \rightarrow w_i X_m^{(i)}$. The weighting factors $w_i$ may reflect a determination that the information content provided by data from certain sensors 104 is more relevant in identifying abnormalities than the data from other sensors 104. The assignment of weighting factors may thus be an adaptive process in which the weighting factors are adjusted periodically on the basis of obtained versus desired results. Such backpropagation may be implemented using backpropagation neural networks or some similar design known to those of skill in the art.

Figure 5:
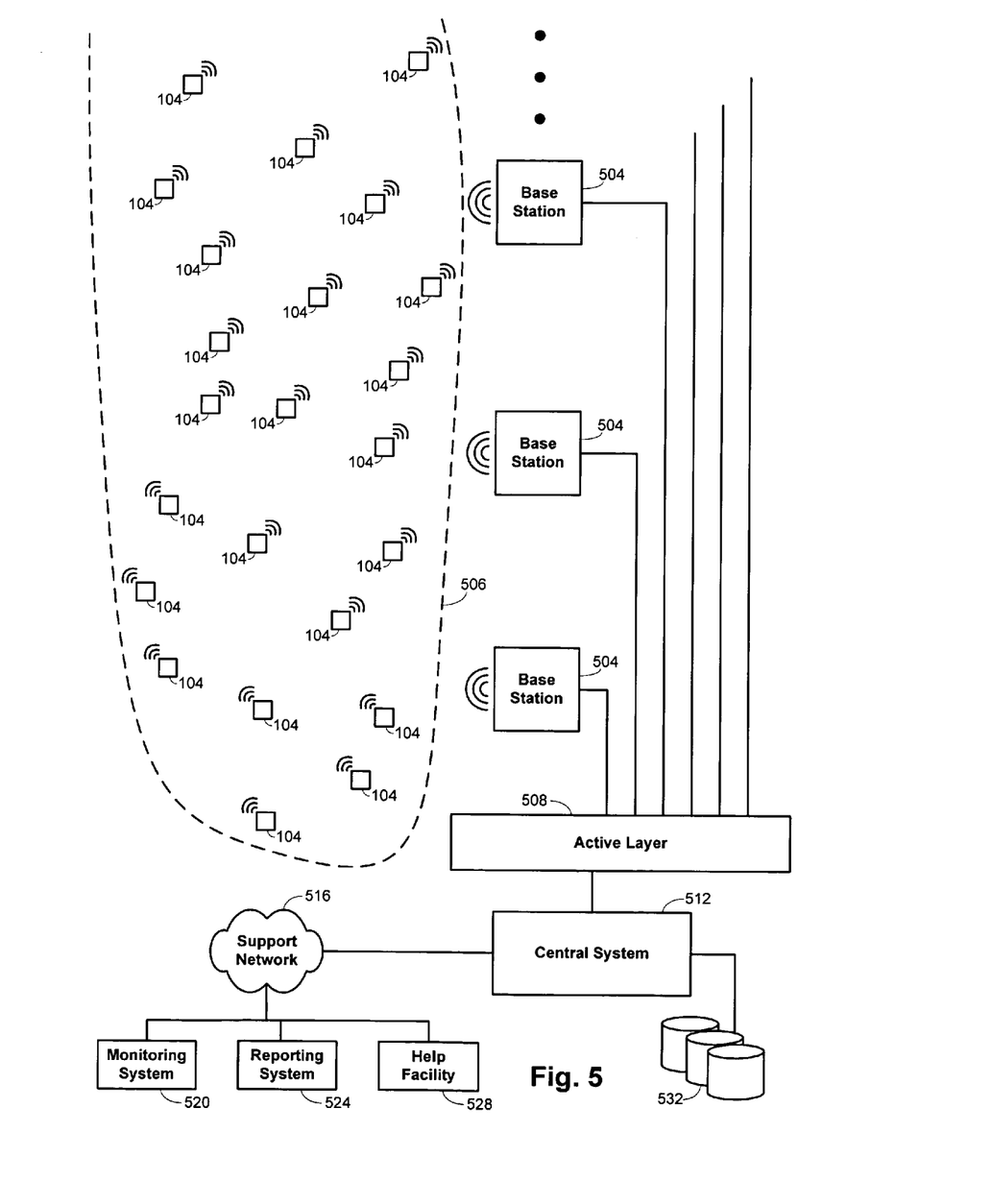
FIG. 5 is a schematic illustration of a structural layout for a monitoring system in embodiments of the invention.

An illustration is provided schematically in FIG. 5 of how information is collected from the fluid-distribution system using the sensors 104, and how it is combined in making determinations to identify a potential anomaly. The distribution of sensors 104 is denoted generally by envelope 506, which is intended to illustrate that the sensors 104 have a physical distribution that corresponds to the arrangement provided by the structure of the fluid-distribution system, but have peer-to-peer communications in forming dynamic network paths that are not constrained by that physical arrangement. That is, several sensors 104 may be distributed along parallel fluid channels that have no downstream connection, and may have only a very remote upstream connection, so are effectively isolated physically, at least with respect to downstream fluid paths. But at the same time, their actual physical separation for wireless communication may be sufficiently short that peer-to-peer communications may be established between them. Each sensor 104 generally includes information identifying its location, which it transmits with the data describing its measurements of the fluid. The location information may be in the form of an actual physical coordinate, but may sometimes more usefully be provided in terms of the logical hierarchical branching structure of the fluid-distribution system. That is, a particular sensor 104 may broadcast that it is located in a particular section by using an identification of the hierarchy illustrated in FIG. 2, i.e. by broadcasting that it is in the section of fluid conduit between two identified nodes or by specifying its position in the hierarchy with a label like Ca3iv.

Base stations 504 are distributed so that dynamic network paths may be used to access the data being provided by each of the sensors 104 distributed within the fluid-distribution system. The total amount of data collected clearly depends on the overall size of the fluid-distribution system and on the number of sensors 104 distributed within it, but is generally expected to be large. An intermediate active layer 508 may be provided to allow both coordination of the information from the different sensors 104 to be performed and to allow a central system 512 to be used in performing monitoring functions, with relevant data being stored for access by the central system 512 on one or more databases 532. The active layer 508 comprises a suite of server and client resident software that enables data collection and event detection in real time in an adaptable fashion, and is described in further detail for other applications in copending U.S. patent application Ser. No. 09/871,996, the entire disclosure of which is incorporated herein by reference for all purposes. The active layer 508 also provides a mechanism by which adjusted weighting factors may be backpropagated to the monitoring modules to improve their generation of results. The central system 512 thus acts to perform analyses such as those described above in identifying events and potential anomalies in the fluid-distribution system.

The central system 512 may also act as an interface through which additional functionality is provided. For example, support functionality may be provided through a support network 516 that is interfaced with a monitoring system 520 that provides monitoring personnel with conclusions defining a state of the fluid-distribution system derived by the central system 512, a reporting system 524 that generates periodic reports for customers regarding the state of the fluid-distribution system, and a help facility 528 that allows customers access to make inquiries about the results or operation of the system.

There are a number of embodiments in which the fluid-distribution system is one of several environments that may be monitored simultaneously. For example, a second fluid-distribution system might be monitored in which a structure similar to that described in connection with FIG. 2 is used for the distribution of different fluids, such as for the distribution of drinking water and air. The monitoring of each of the fluid-distribution systems may be performed similarly to that described above, using a network of distributed sensors having peer-to-peer communications capabilities. Furthermore, different types of environments may also be monitored in parallel with the fluid-distribution environment(s). For example, a static physical environment may be monitored or other types of distribution environments like power-distribution environments may by monitored. In such instances, the central system 508 may additionally be coupled with data receivers from such environments to perform similar types of analyses in identifying the occurrence of events or potential anomalies in those environments. The data from separate environments may, moreover, itself be coupled to identify multi-environment events, such as by using techniques described in greater detail in copending, commonly assigned U.S. patent application Ser. No. 10/839,980, entitled "METHODS AND SYSTEMS FOR MONITORING ENVIRONMENTS," filed May 5, 2004 by M. Sam Araki et al., the entire disclosure of which is incorporated herein by reference for all purposes. That application additionally includes further description of the application of fuzzy logic in processing data for the identification of potential anomalies, and such application of fuzzy logic may be used in the types of analysis described above for specific analysis of fluid-distribution environments.

Figure 6:
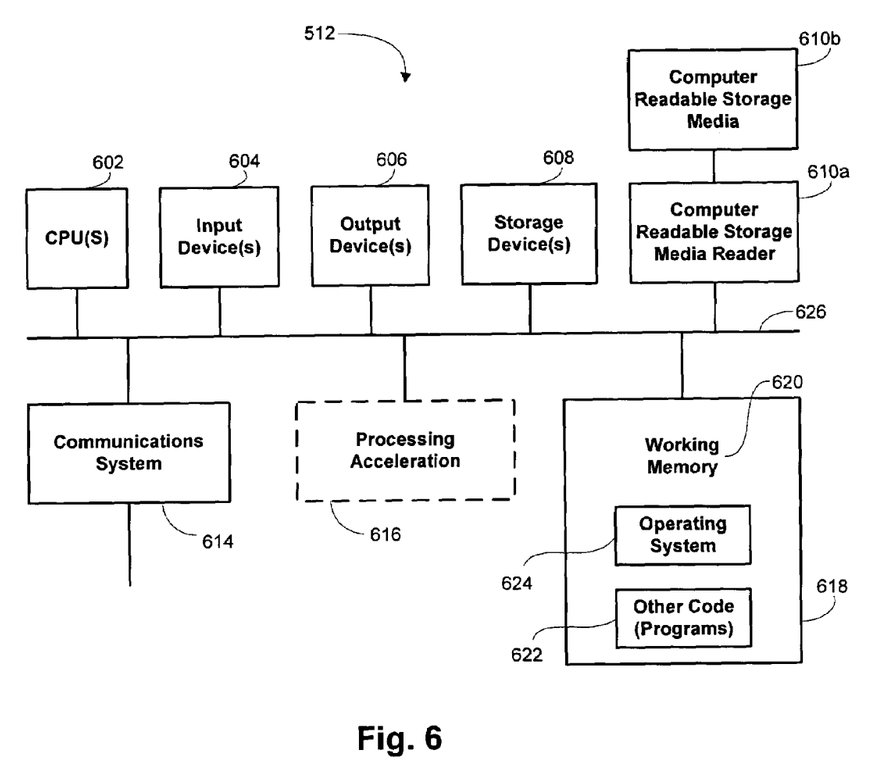
FIG. 6 illustrates a structure that may be used for a computer system on which methods of the invention may be embodied.

FIG. 6 provides a schematic illustration of a structure that may be used to implement the central system 512. FIG. 6 broadly illustrates how individual system elements may be implemented in a separated or more integrated manner. The central system 512 is shown comprised of hardware elements that are electrically coupled via bus 626, including a processor 602, an input device 604, an output device 606, a storage device 608, a computer-readable storage media reader 610a, a communications system 614, a processing acceleration unit 616 such as a DSP or special-purpose processor, and a memory 618. The computer-readable storage media reader 610a is further connected to a computer-readable storage medium 10b, the combination comprehensively representing remote, local, fixed, and/or removable storage devices plus storage media for temporarily and/or more permanently containing computer-readable information. The communications system 614 may comprise a wired, wireless, modem, and/or other type of interfacing connection and permits data to be exchanged with the active layer 508, databases 532, support network 516, and other interfaces that may be used in coordinating processing for other environments.

The central system 512 also comprises software elements, shown as being currently located within working memory 620, including an operating system 624 and other code 622, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A system for monitoring a state of a fluid-distribution system, the system comprising:

a plurality of sensors distributed spatially within the fluid-distribution system, each of the sensors being in peer-to-peer communication with another of the sensors to define a dynamically networked arrangement of sensors within the fluid-distribution system, at least one of the sensors having an illumination source, a light detector, and a controller in communication with the illumination source and light detector to measure a photometric parameter of fluid in the fluid-distribution system local to the at least one of the sensors;

a base station in communication with at least one of the sensors to access the networked arrangement of sensors; and a central system in communication with the base station and having programming instructions to identify an abnormality in the fluid-distribution system from data collected by the plurality of sensors by issuing an alarm.

2. The system recited in claim 1 wherein the programming instructions include:
   instructions to identify the occurrence of an event local to at least one of the sensors by identifying a change in an event-defining parameter;
   instructions to extract a plurality of derived parameters from the collected data;
   instructions to determine a cross-correlation of the extracted plurality of derived parameters over the plurality of sensors; and
   instructions to identify the abnormality from the determined cross-correlation.

3. The system recited in claim 2 wherein:
   the collected data comprises a plurality of time-period correlatable parameters; and
   the instructions to extract the plurality of derived parameters comprise instructions to calculate an autocorrelation of each of the plurality of time-period correlatable parameters.

4. The system recited in claim 1 wherein the fluid-distribution system comprises a hierarchical branching network with the plurality of sensors distributed throughout the hierarchical branching network.

5. The system recited in claim 4 wherein at least one sensor is positioned between every pair of sequential nodes comprised by the hierarchical branching network.

6. The system recited in claim 1 wherein the photometric parameter comprises turbidity.

7. The system recited in claim 1 wherein the photometric parameter comprises a light-scattering parameter.

8. The system recited in claim 1 wherein the photometric parameter comprises a light-obfuscation parameter.

9. The system recited in claim 1 wherein:
   the illumination source comprises a multicolor illumination source; and
   the photometric parameter comprises a calorimetric parameter.

10. The system recited in claim 1 wherein:
    the illumination source comprises a broadband illumination source;
    the at least one of the sensors comprises an optically dispersive element disposed to separate spectral bands of light incident on the light detector; and
    the photometric parameter comprises a spectrophotometric parameter.

11. The system recited in claim 1 wherein the illumination source and the light detector have optical axes relatively oriented at a nonzero angle.

12. The system recited in claim 1 wherein the illumination source and the light detector have optical axes relatively oriented at substantially 90°.

13. The system recited in claim 1 wherein the illumination source and the light detector have optical axes relatively oriented at substantially 180°.

14. The system recited in claim 1 wherein the at least one of the sensors further has a chemical detector.

15. The system recited in claim 1 wherein the at least one of the sensors further has a detector selected from the group consisting of a temperature detector, a pH detector, and a conductivity detector.

16. The system recited in claim 1 wherein the at least one of the sensors further comprises a vibration power source to supply energy to the controller by extracting energy from motion of the fluid local to the at least one of the sensors.

17. The system recited in claim 1 wherein:
    the fluid-distribution system is one of a plurality of environments, each such environment having a state monitored by the system; and
    the central system further has programming instructions to correlate abnormalities identified in each of the environments to provide a collective characterization of the plurality of environments.

18. A method for monitoring a state of a fluid-distribution system, the method comprising:
    collecting data from a plurality of sensors distributed spatially within the fluid-distribution system, each of the sensors being in peer-to-peer communication with another of the sensors to define a dynamically networked arrangement of sensors within the fluid-distribution system, at least one of the sensors having an illumination source, a light detector, and a controller in communication with the illumination source and light detector to measure a photometric parameter of fluid in the fluid-distribution system local to the at least one of the sensors;
    identifying an abnormality in the fluid-distribution system from the collected data; and
    issuing an alarm in response to identifying the abnormality.

19. The method recited in claim 18 wherein identifying the abnormality from the collected data comprises:
    identifying the occurrence of an event local to at least one of the sensors by identifying a change in an event-defining parameter;
    extracting a plurality of derived parameters from the collected data;
    determining a cross-correlation of the extracted plurality of derived parameters over the plurality of sensors; and
    identifying the abnormality from the determined cross-correlation.

20. The method recited in claim 19 wherein:
    the collected data comprises a plurality of time-period correlatable parameters; and
    extracting the plurality of derived parameters comprises calculating an autocorrelation of each of the plurality of time-period correlatable parameters.

21. The method recited in claim 18 wherein the fluid-distribution system comprises a hierarchical branching network with the plurality of sensors distributed throughout the hierarchical branching network.

22. The method recited in claim 21 wherein at least one sensor is positioned between every pair of sequential nodes comprised by the hierarchical branching network.

23. The method recited in claim 18 wherein the photometric parameter comprises turbidity.

24. The method recited in claim 18 wherein the photometric parameter comprises a light-scattering parameter.

25. The method recited in claim 18 wherein the photometric parameter comprises a light-obfuscation parameter.

26. The method recited in claim 18 wherein:
    the illumination source comprises a multicolor illumination source; and the photometric parameter comprises a calorimetric parameter.

27. The method recited in claim 18 wherein:
the illumination source comprises a broadband illumination source;
the at least one of the sensors comprises an optically dispersive element disposed to separated the spectral bands of light incident on the light detector; and
the photometric parameter comprises a spectrophotometric parameter.

28. The method recited in claim 18 wherein the illumination source and the light detector have optical axes relative oriented at a nonzero angle.

29. The method recited in claim 18 wherein the at least one of the sensors further has a detector selected from the group consisting of a chemical detector, a temperature detector, a pH detector, and a conductivity detector.

30. The method recited in claim 18 wherein the at least one of the sensors further comprises a vibration power source to supply energy to the controller by extracting energy from motion of the fluid local to the at least one of the sensors.

31. The method recited in claim 18 wherein the fluid distribution system is one of a plurality of environments, the method further comprising:
monitoring a state of each such environment; and
correlating abnormalities identified in each of the environments to provide a collective characterization of the plurality of environments.

* * * * *